(12) United States Patent
Tekwani

(10) Patent No.: US 9,071,649 B2
(45) Date of Patent: *Jun. 30, 2015

(54) SYSTEM AND METHOD FOR REAL TIME DELIVERY OF CONTEXT BASED CONTENT FROM THE CLOUD TO MOBILE

(71) Applicant: Core Mobile Networks, Inc., Santa Clara, CA (US)

(72) Inventor: Chandra S. Tekwani, San Jose, CA (US)

(73) Assignee: Core Mobile Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,919

(22) Filed: Dec. 3, 2013

(65) Prior Publication Data
US 2014/0089462 A1    Mar. 27, 2014

Related U.S. Application Data

(63) Continuation of application No. 12/963,411, filed on Dec. 8, 2010, now Pat. No. 8,606,923.

(60) Provisional application No. 61/383,158, filed on Sep. 15, 2010.

(51) Int. Cl.
*H04L 29/08* (2006.01)
*H04W 4/20* (2009.01)

(52) U.S. Cl.
CPC ............. *H04L 67/26* (2013.01); *H04L 67/30* (2013.01); *H04W 4/20* (2013.01); *H04L 67/02* (2013.01)

(58) Field of Classification Search
CPC ......... H04L 67/30; H04L 67/26; H04L 67/02; H04W 4/20

USPC ............... 709/217, 223, 224, 226, 219, 218
See application file for complete search history.

(56) References Cited

U.S. PATENT DOCUMENTS

| 6,151,601 A | 11/2000 | Papierniak et al. |
| 7,493,622 B2 | 2/2009 | Borkan |

(Continued)

FOREIGN PATENT DOCUMENTS

| EP | 1411443 A1 * | 4/2004 |
| EP | 2028441 A1 * | 2/2009 |

(Continued)

OTHER PUBLICATIONS

"Salesforce Mobile," retrieved online at www.salesforce.com/mobile/apps/salesforcemobile/ on Dec. 8, 2010, 2 pages.

(Continued)

*Primary Examiner* — Kostas Katsikis
(74) *Attorney, Agent, or Firm* — Sheppard, Mullin, Richter & Hampton LLP

(57) ABSTRACT

The information in the cloud is available in the form of software-as-a-service is accessible from laptops and personal computers. The system obtains information from multiple sources in the "cloud," correlates the information, determines a subset of information based on context, and pushes the information to at least one mobile device. An engine extracts a context based subset of information and correlates the context based subset of information based on the same context or a different context. A data push engine makes the information available in real time to a user by pushing the information to the at least one mobile device like a smartphone, tablet, and/or navigation system.

14 Claims, 12 Drawing Sheets

(56) References Cited

U.S. PATENT DOCUMENTS

| | | | |
|---|---|---|---|
| 7,558,861 B1 | 7/2009 | Qidwai et al. | |
| 7,613,722 B2* | 11/2009 | Horvitz et al. | 1/1 |
| 7,949,529 B2* | 5/2011 | Weider et al. | 704/270 |
| 8,032,508 B2* | 10/2011 | Martinez et al. | 707/708 |
| 8,069,219 B2 | 11/2011 | Wikman et al. | |
| 8,180,376 B1 | 5/2012 | Merritt | |
| 8,909,749 B2* | 12/2014 | Branch et al. | 709/223 |
| 2003/0123423 A1 | 7/2003 | Okanoue | |
| 2003/0187984 A1 | 10/2003 | Banavar et al. | |
| 2004/0133848 A1 | 7/2004 | Hunt et al. | |
| 2004/0220895 A1 | 11/2004 | Carus et al. | |
| 2005/0076095 A1* | 4/2005 | Mathew et al. | 709/217 |
| 2005/0154780 A1 | 7/2005 | Sarja et al. | |
| 2005/0163104 A1 | 7/2005 | Christensen et al. | |
| 2005/0171980 A1 | 8/2005 | Fernandez et al. | |
| 2005/0262428 A1 | 11/2005 | Little et al. | |
| 2006/0056351 A1 | 3/2006 | Wall | |
| 2006/0089160 A1 | 4/2006 | Othmer | |
| 2006/0111111 A1 | 5/2006 | Ovadia | |
| 2007/0030824 A1* | 2/2007 | Ribaudo et al. | 370/328 |
| 2007/0143260 A1 | 6/2007 | Markov et al. | |
| 2008/0037586 A1 | 2/2008 | Herrero-Veron et al. | |
| 2008/0045236 A1 | 2/2008 | Nahon et al. | |
| 2008/0049714 A1 | 2/2008 | Commarford et al. | |
| 2008/0196046 A1 | 8/2008 | Athas et al. | |
| 2008/0201452 A1 | 8/2008 | Athas et al. | |
| 2009/0013038 A1 | 1/2009 | Vogler et al. | |
| 2009/0036102 A1 | 2/2009 | Ho | |
| 2009/0063419 A1 | 3/2009 | Nurminen et al. | |
| 2009/0204666 A1 | 8/2009 | Sana et al. | |
| 2009/0248693 A1 | 10/2009 | Sagar et al. | |
| 2010/0125604 A1* | 5/2010 | Martinez et al. | 707/784 |
| 2010/0189004 A1 | 7/2010 | Mirandette et al. | |
| 2010/0229082 A1 | 9/2010 | Karmarkar et al. | |
| 2010/0262449 A1* | 10/2010 | Monteforte et al. | 705/8 |
| 2011/0208695 A1 | 8/2011 | Anand et al. | |
| 2011/0238545 A1 | 9/2011 | Fanaian et al. | |
| 2011/0276689 A1* | 11/2011 | Rosen | 709/224 |
| 2012/0023223 A1 | 1/2012 | Branch et al. | |
| 2012/0117232 A1* | 5/2012 | Brown et al. | 709/224 |
| 2013/0179439 A1 | 7/2013 | Handman et al. | |
| 2013/0185359 A1 | 7/2013 | Liu et al. | |
| 2014/0282915 A1* | 9/2014 | Tekwani | 726/4 |

FOREIGN PATENT DOCUMENTS

| | | | |
|---|---|---|---|
| JP | 2007193794 | | 8/2007 |
| WO | WO 2009084749 A1 * | | 7/2009 |

OTHER PUBLICATIONS

"ServiceMax for iPad," retrieved online at www.servicemax.com/products/servicemax-for-ipad.html on Dec. 8, 2010, 12 pages.

"Smartphone Mobile Internet Experience Enhancement & Optimization," retrieved online at http://www.novarra.com/solutions/smarter-smartphones/ on Dec. 8, 2010, 4 pages.

International Application No. PCT/US2011/051565, International Search Report and Written Opinion mailed Jan. 6, 2012.

\* cited by examiner

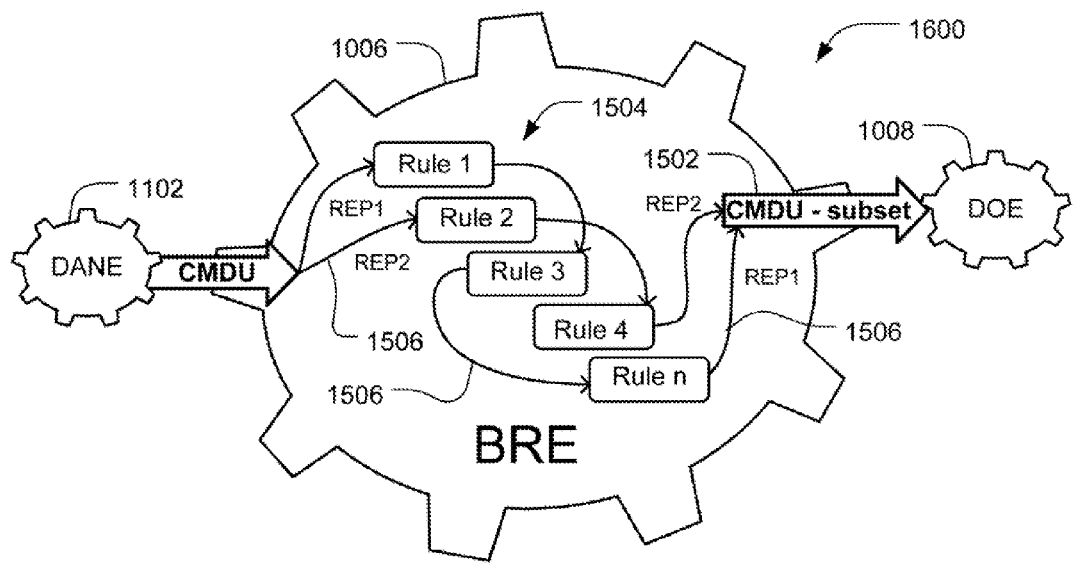
FIG. 16
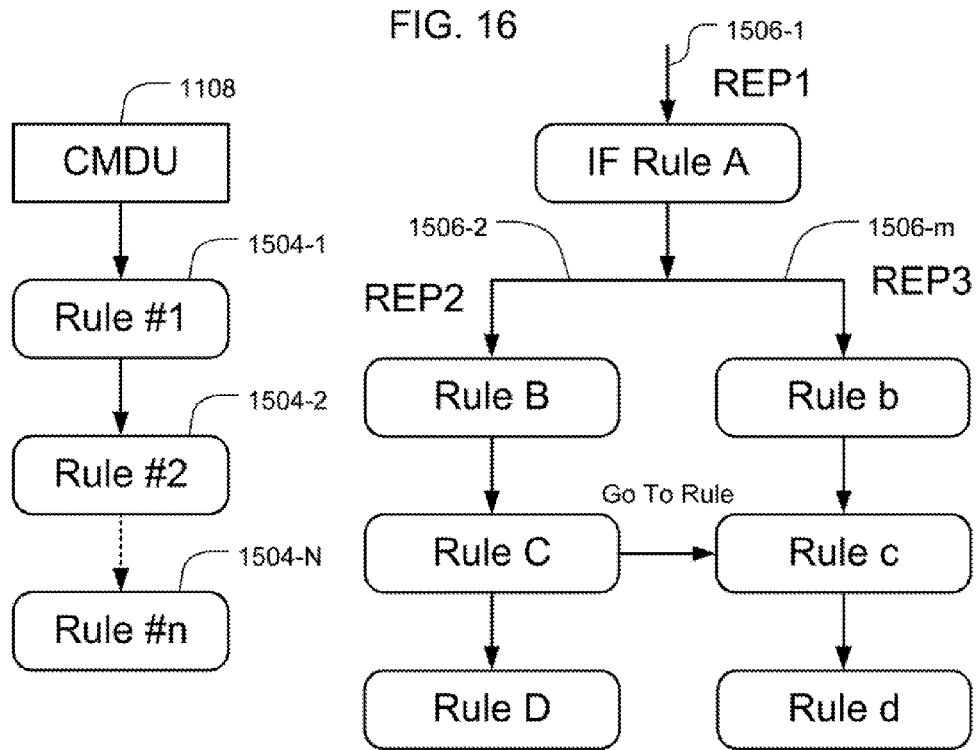
FIG. 17
FIG. 18

SYSTEM AND METHOD FOR REAL TIME DELIVERY OF CONTEXT BASED CONTENT FROM THE CLOUD TO MOBILE

CROSS REFERENCE TO RELATED APPLICATIONS

This application is a continuation of U.S. patent application Ser. No. 12/963,411, filed Dec. 8, 2010, entitled "System and Method for Real Time Delivery of Context Based Content from the Cloud to Mobile Devices", which claims the benefit of U.S. Patent Provisional Application No. 61/383,158 filed on Sep. 15, 2010, the entirety of which is hereby incorporated by reference.

FIELD OF TECHNOLOGY

The present disclosure relates generally to software-as-a-service for information delivery and in particular to a method and system for real time delivery of context based information to mobile devices, in which services and storage are provided over the Internet (or "cloud").

BACKGROUND

Cloud computing is generally defined as Internet-based computing, where shared resources such as software and information are provided to computers and other devices on-demand. Cloud based services are continuing to grow rapidly with the cloud based application market expected to be $42 BN in 2012. Of this market, business applications are expected to be over $21 BN in 2012. Cloud based applications, however, are designed to be accessible from laptops and personal computers over the internet. These applications do not address the need for mobility by service personnel who do not have access to a computer at the time and have only a small mobile device with limited screen size and computing power at disposal. The full promise of cloud based services is not being realized due to lack of mechanism to determine a subset of information based on user context to be delivered to the mobile devices such as smartphones. A smartphone is a mobile device offering advanced capabilities, often with personal computer (PC)-like functionality. Although there is no industry standard definition of a smartphone, it is generally considered to be an electronic handheld device that integrates the functionality of a mobile phone, personal digital assistant (PDA) or other information appliance that can also access the Internet over wireless networks.

Smartphone adoption is continuing to increase with over 400M smartphones expected to be in use by 2012. The increasing adoption of smartphones is driving the need for cloud based information to be delivered in real time to small screen smartphones over WiFi, 2G, 3G and 4G wireless networks Accordingly, there is a need for providing software-as-a-service to take any application in the cloud, correlate the information based on a certain context, determine a subset of information based on another or same context, and deliver the information in real time to a mobile device such as a smartphone.

SUMMARY

Various embodiments are disclosed to address the above mentioned shortcomings in getting cloud based application data to mobile devices in a usable and timely manner. In one aspect, a system and method are provided to correlate information from the cloud ("Internet"), determine a context based subset of information, and deliver the context based subset of information to the mobile device in real time.

In another aspect, a system and method are provided for real time delivery of context based information to mobile devices. The system and method provide determining a subset of information based on context after correlation of the information from multiple sources based on the same or another context and providing the correlated subset of information based on context to mobile devices by way of "push" technology, where in an Internet-based communication, the request for a given transaction is initiated by the publisher or central server.

In another aspect, a context based information correlation engine employs real live data from multiple systems on the cloud (Internet) with one or more contexts to correlate and determine a subset.

In another aspect, a context like location of a mobile device is used to determine a smaller most relevant subset of information available.

In another aspect, a context like subject in a calendar entry of a mobile device such as Microsoft® Outlook® is used to determine the most relevant subset of information available.

In another aspect, a common data push mechanisms is used in a device agnostic manner to push the information to a mobile device for real time availability.

In another aspect, when the mobile device is further enhanced with location and identity based security, privacy of information pushed to the mobile device is ascertained.

BRIEF DESCRIPTION OF THE DRAWINGS

Non-limiting and non-exhaustive embodiments are described with reference to the following drawings. For a better understanding of the disclosed embodiments, reference will be made to the following Detailed Description, which is to be read in association with the accompanying drawings, wherein:

FIG. 16 is a diagram of one aspect of a business rules engine.

FIG. 17 is a diagram of one aspect of one or more business logic rules arranged in one or more rule execution paths.

FIG. 18 is a diagram of one aspect of one or more business logic rules arranged in one or more rule execution paths.

DESCRIPTION

Figure 1:
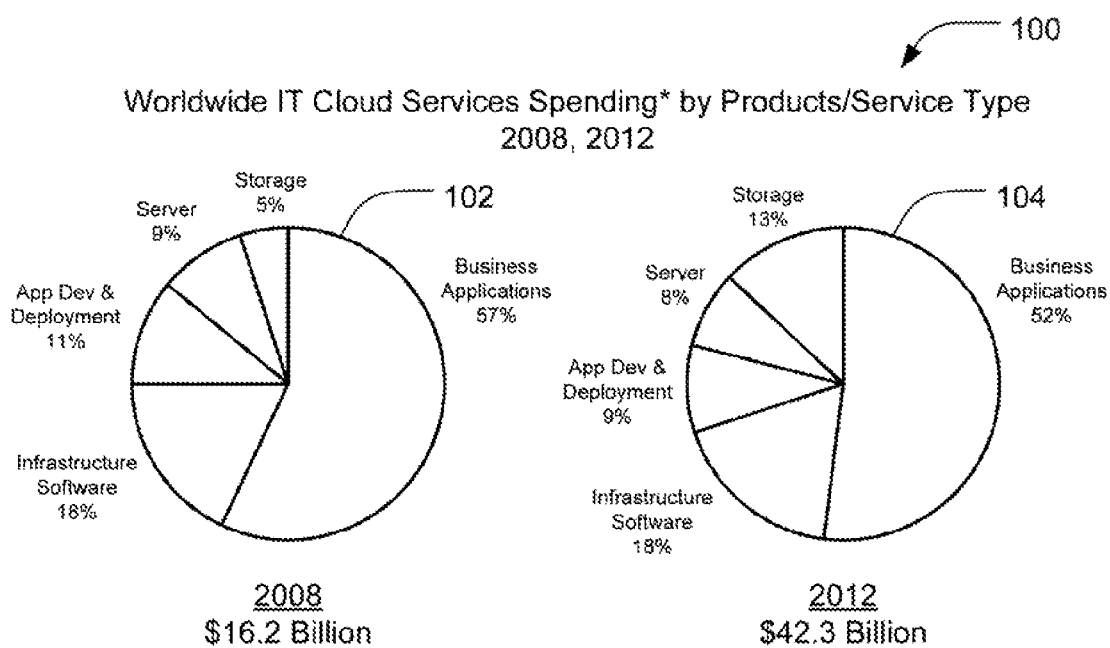
FIG. 1 illustrates comparative pie charts that provide industry data on cloud applications and business applications in the cloud according to the disclosed embodiments.

Various aspects of the present disclosure are directed generally to a system and method for real time delivery of context based information to mobile devices. In one aspect, the present disclosure is directed to providing data from multiple sources in the cloud to a mobile device such as a smartphone or tablet device such as the iPad table computer by Apple®. The data from multiple sources in the cloud may be an enterprise application in a private cloud or from the Internet in the form of a cloud-based application such as, for example, software as a service. There are two major differences between accessing applications from a mobile device rather than a personal computer (PC). One is that a PC has a large screen, bring up a browser, and display more information. On the other hand, a mobile device has a smaller-size screen than the PC so the amount of information to be displays on the screen has to be reduced. In one aspect, the data for mobile devices can be reduced based on a logical context space. Another difference between the PC and the mobile device is the communication link between the mobile device and the source of the application and the source of the data. In case of PCs, there are high-speed Broadband networks, lower densities, and can be easily accessed from a PC with a high capacity processor. Mobile devices, however, have low capacity processors and a very high density network. Therefore, in the case of mobile devices, instead of waiting for the information to be downloaded, a system for real time delivery of context based information determines ahead of time what information the user needs and to pushes that information to the smartphone handset in a certain context.

Accordingly, in one aspect, the disclosed system for real time delivery of context based information determines a context-based subset of information from the cloud and pushes that context-based subset of information to the handset of the mobile device. The context can be any type of context. Two major contexts are location and calendar entry on the mobile device. For example, a meeting associated with a calendar entry may have a certain subject associated with it. Based on the subject for that meeting, information can be extracted from the cloud, a subset of that information is determined, and the subset is pushed to the mobile device. In case of location, a subset of information can be determined based on the location of the mobile device and the subset of information pushed to the mobile device.

In one general aspect, the system for real time delivery of context based information may be implemented using four software modules or engines: a data acquisition engine, a data normalization engine, a business rules engine, and a data output engine. The data acquisition portion determines where to get the data. Data that resides on a website may be scraped using a web scrape. Flat data residing on some servers may be extracted from there. Software as a service like salesforce.com has an application programming interface (API) publisher with a complete and consistent list of partners. The APIs may be employed in terms of web service to language to acquire data. A data acquisition agent handles the data acquisition portion. Once the data is obtained, it may require normalization so that business rules can be applied to the normalized data. For example, if the rule requires getting data from two multiple sources then there has to be some way to get the data normalized in a manner that the business rules engine can understand the data in a consolidated manner. Because the data will be received from two different sources and two different formats with two different ordering, the business rules engine will normalize the data.

In some aspects, the data acquisition and data normalization portions may be implemented as one engine in a data acquisition and normalization engine (DANE). The DANE receives and normalizes the data and outputs the normalized data in a format referred to as a cloud mobile data unit (CMDU). The CMDU is passed on to the business rules engine and then business rules engine applies the correlation, determines the subset, and passes it on to a data output engine which then pushes it to the mobile device. The push to the mobile device is done in a device agnostic manner because different mobile devices support different types of push engines, different service providers use different type of pushing, and there are different enterprises using different type of pushing engines. The system for real time delivery of context based information performs data acquisition and normalization and then applies the business rules engine to perform correlation and subset determination. Various aspects of how to perform the correlation between multiple sources and how to determine the subset of information so that the information can be pushed to the mobile device are disclosed hereinbelow. The subset of the correlated information can then be display in a mobile device, such as a smartphone or tablet device, in a manner that it can be displayed on a smaller screen. Prior to turning to a description of a system for real time delivery of context based information, the present description first turns to FIGS. 1 and 2 for description of comparative pie charts that provide industry data on cloud applications and business applications in the cloud and a bar graph that provides industry data on adoption of smartphones and tablet devices, among other mobile devices.

FIG. 1 illustrates comparative pie charts 100 that provide industry data on cloud applications and business applications in the cloud according to the disclosed embodiments. A first pie chart 102 shows worldwide IT cloud services spending by product/service type in 2008 and a second pie chart 104 shows projected worldwide IT cloud services spending by product/service type in 2012. The total spend of about $16.2 billion in 2008 is projected to increase to about $42.3 billion in 2010, which relates to about a $21 billion spend on business applications in 2012. The largest portion of market size for worldwide IT cloud services spending is business applications. The business applications portion is estimated to be $21 billion in 2012, which is where the various aspects of the disclosed embodiments of the system and method for real time delivery of context based information to mobile devices are likely to be employed.

Figure 2:
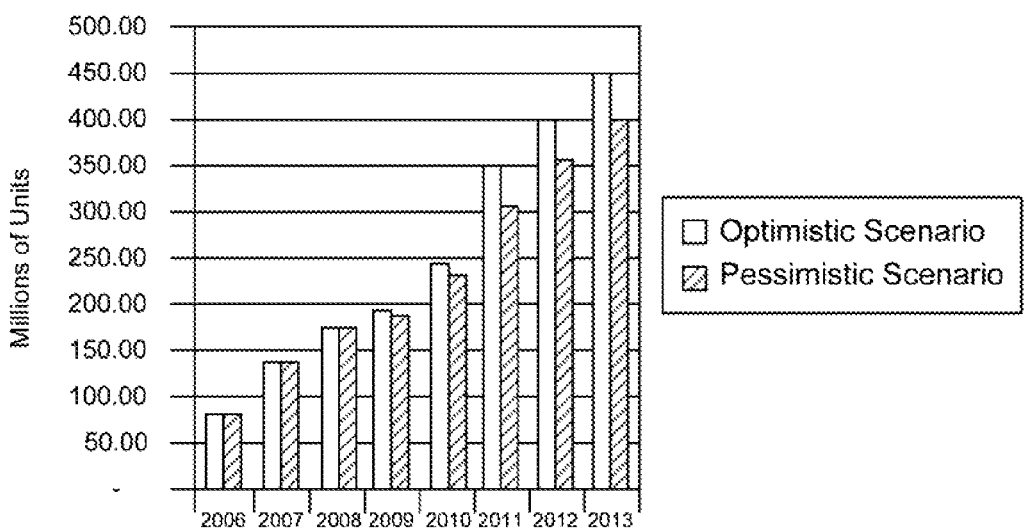
FIG. 2 illustrates a bar graph that provides industry data on adoption of smartphones and tablet devices according to the disclosed embodiments.

FIG. 2 illustrates a bar graph 200 that provides industry data on adoption of smartphones and tablet devices according to the disclosed embodiments. The bar graph 200 represents global smartphone unit shipment forecast in millions of units where "Million of Units" is shown along the vertical axis and "Year" is shown along the horizontal axis. As indicated in the bar graph 200, the global smartphone shipments have continued to increase despite the slowdown in the world economy and the growth in adoption of smartphones is estimated to be over 400 Million smartphones in 2012. Various aspects of the disclosed embodiments provide a system and method for delivery of information from cloud based systems to these smartphones.

Figure 3:
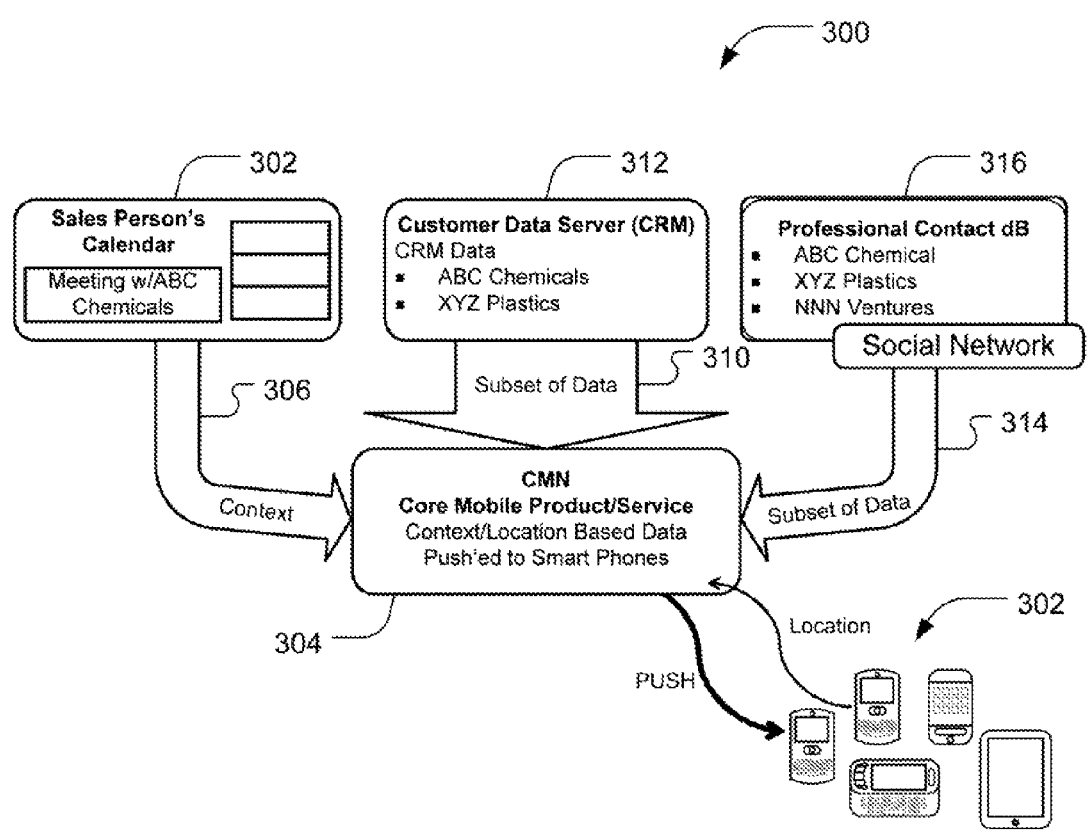
FIG. 3 illustrates one aspect of a system for real time delivery of context based information for use in a field sales application according to the disclosed embodiments.

FIG. 3 illustrates one aspect of a system 300 for real time delivery of context based information for use in a field sales application according to the disclosed embodiments. In the system 300 illustrated in FIG. 3, a method is directed to real time delivery of context based information in a sales leads and customer relationship management application where information to be pushed to a mobile device 302 is based on calendar entry in enterprise exchange server or mobile device 302 or location of the mobile device 302 spanning all current and adjacent zip codes. According to one aspect, the system 300 is directed to a field sales application where a mobile product service application 304 in a core mobile network determines a context 306 based on a calendar entry 308 and determines a subset of data 310 from a customer data server 312 and/or a subset of data 314 from a professional contacts database 316. The mobile product service application 304 comprises a context based correlation engine (e.g., module) to correlate the subset of data 310, 314 based on the context 306 match between the multiple data systems 312, 316. In one aspect, the correlated data may be entered (e.g., stored) in a database. When a match for push criteria exists, the mobile product service application 304 pushes the subset of data 310, 314 as specified in the push mechanism of the mobile device 302 using a push delivery engine.

In one aspect, a method is directed for field service professional to push new leads to the mobile device 302 based on current location of the service personnel's mobile device 302 and anticipated duration of current task. The service lead information may be extracted from web based service lead systems such as servicemagic.com, servicemax.com and correlated with context and criteria before being pushed to the mobile device 302.

In various embodiments, the mobile device 302 may be implemented as a handheld portable device, computer, mobile telephone, sometimes referred to as a smartphone, tablet personal computer (PC), kiosk, desktop computer, or laptop computer, or any combination thereof. Examples of smartphones include, for example, Palm® products such as Palm® Treo® smartphones, Blackberry® smart phones, Apple® iPhone®, and the like. Although some embodiments of the mobile device 302 may be described with a mobile or fixed computing device implemented as a smart phone, personal digital assistant, laptop, desktop computer by way of example, it may be appreciated that the embodiments are not limited in this context. For example, a mobile computing device may comprise, or be implemented as, any type of wireless device, mobile station, or portable computing device with a self-contained power source (e.g., battery) such as the laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. A fixed computing device, for example, may be implemented as a desk top computer, workstation, client/server computer, and so forth.

In various embodiments, the mobile device 302 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wideband CDMA (WCDMA), CDMA-2000, Universal Mobile Telephone System (UMTS) systems, WiMAX (Worldwide Interoperability for Microwave Access, LTE (Long Term Evolution) and so forth.

In various embodiments, the mobile device 302 may be configured to provide voice and/or data communications functionality in accordance with different types of wireless network systems or protocols. Examples of suitable wireless network systems offering data communication services may include the Institute of Electrical and Electronics Engineers (IEEE) 802xx series of protocols, such as the IEEE 802.1a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 700 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

In various embodiments, the interface device 302 is configured to couple to a communication interface to access the cloud (Internet). The communication interface may form part of a wired communications system, a wireless communications system, or a combination of both. For example, the mobile device 302 may be configured to communicate information over one or more types of wired communication links such as a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The mobile device 302 may be arranged to communicate information over one or more types of wireless communication links such as a radio channel, satellite channel, television channel, broadcast channel infrared channel, radio-frequency (RF) channel, WiFi channel, a portion of the RF spectrum, and/or one or more licensed or license-free frequency bands. In wireless implementations, the mobile device 302 may comprise one more interfaces and/or components for wireless communication such as one or more transmitters, receivers, transceivers, amplifiers, filters, control logic, wireless network interface cards (WNICs), antennas, and so forth.

Figure 4:
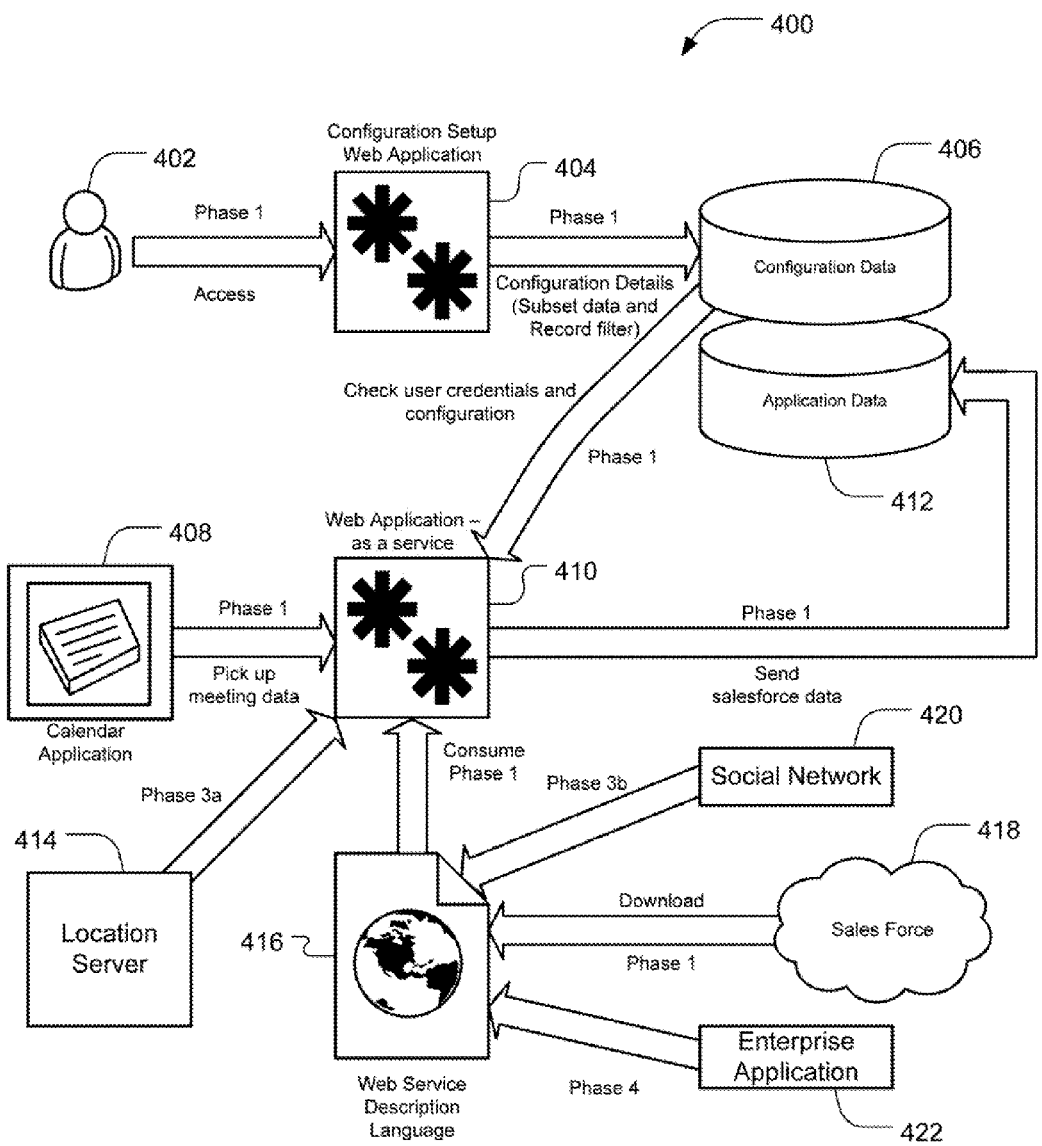
FIG. 4 illustrates one aspect of a system for real time delivery of context based information in a field sales application according to the disclosed embodiments.

FIG. 4 illustrates one aspect of a system 400 for real time delivery of context based information in a field sales application for field sales personnel according to the disclosed embodiments. In the system 400 illustrated in FIG. 4, a method is directed to real time delivery of context based information in a field sales application. According to one aspect, in the system 400 a configuration setup-web application 404 is accessed by a user 402, which provides configuration details (subset data and record filter) to a local database 406. A web application-as-a-service 410 obtains meeting data from a calendar 408 such as an Outlook® calendar, for example. The web application-as-a-service 410 also obtains configuration data form the configuration database 406, a location server 414, and/or a web server 416. As illustrated in FIG. 4, the web server 416 may receive information over the cloud (Internet) from a salesforce server 418, a professional social network server 420, such LinkedIn, and/or enterprise application server 422. The web server 416 provides the information to the application-as-a-service 410 in the form of web service description language. The information received by the application-as-a-service 410 is then stored in an application database 412.

Figure 5:
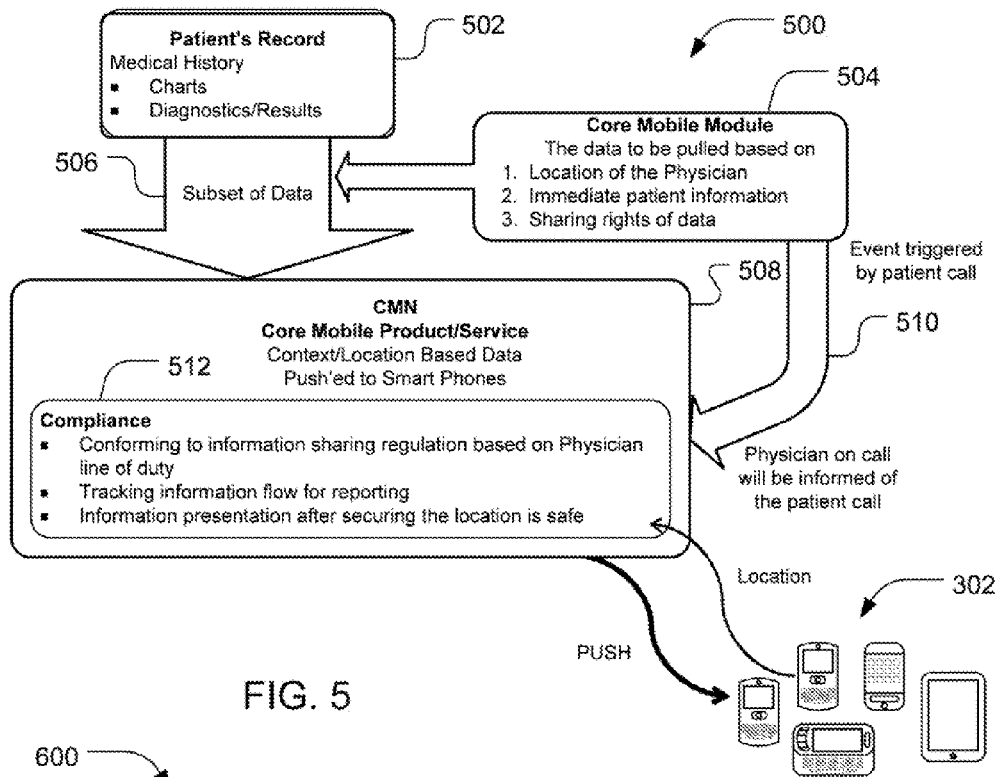
FIG. 5 illustrates one aspect of a system for real time delivery of context based information in a healthcare application according to the disclosed embodiments.

FIG. 5 illustrates one aspect of a system 500 for real time delivery of context based information in a healthcare application according to the disclosed embodiments. In the system 500 illustrated in FIG. 5, a method is directed to real time delivery of context based information in a healthcare application. According to one aspect, the system 500 is directed to healthcare providers like primary care physicians receive relevant patient information 502 such as, for example, patient records, medical history, charts, diagnostic, results, from an Electronic Medical Record (EMR) system 502, for example. In one aspect, this information can be obtained when the attending nurse takes a patient call and pages the physician. A module 504 determines a subset 506 of the patient information 502 available from the electronic medical records system and pulls the subset 506 of information based on location of the physician, immediate patient information, sharing rights of data, among other basis, for example. In one aspect, a mobile product service application 508 in a core mobile network processes the subset 506 of information in a context 510 based on an event triggered by a patient call to the physician office where the physician on call will be informed of the patient call. In one aspect, the method includes a compliance mechanism 512 to ascertain privacy of the patient information 502 based on identification of the mobile device 302, user, and location in addition to ascertaining compliance requirements in accordance with regulations set forth by the Health Insurance Portability and Accountability Act (HIPAA). The HIPPA regulations require tracking of patient private data as it moves from a secure EMR system to the mobile device 302 (handset) and deletion of the same on the mobile device 302 (handset) after recording the person who viewed the information. In another aspect, a method is directed at medical device vendors to extract real patient data from the medical device in the field, correlate the information with patient's electronic medical record data 502 and push new settings to the device from the cloud based system.

Figure 6:
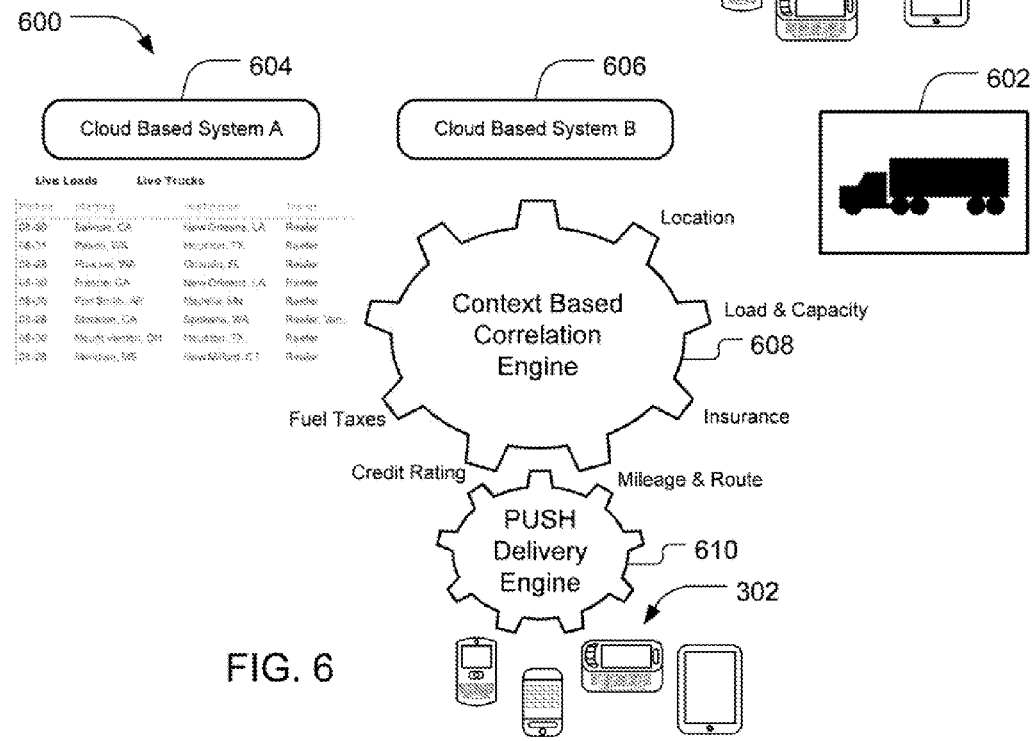
FIG. 6 illustrates one aspect of a system for real time delivery of context based information in a trucking application according to the disclosed embodiments.

FIG. 6 illustrates one aspect of a system 600 for real time delivery of context based information in a trucking application according to the disclosed embodiments. In the system 600 illustrated in FIG. 6, a method is directed to real time delivery of context based information in a trucking application. According to one aspect, the system 600 is directed to fleet managers for truckers and truck drivers (collectively 602) to extract new load information from cloud based systems like getloaded.com 604 and 123loads.com 606, perform context based correlation using a context based correlation engine 608 based on location of truck, load and capacity in the truck, insurance, mileage and route, credit worthiness score, and fuel taxes information insurance and, using a push delivery engine 610, send a message to the fleet manager to authorize pickup. In one aspect, the system 600 sends the location of pickup and directions to the trucker's mobile device 302 which can be a smartphone, a tablet or a built-in navigation device in the truck.

Figure 7:
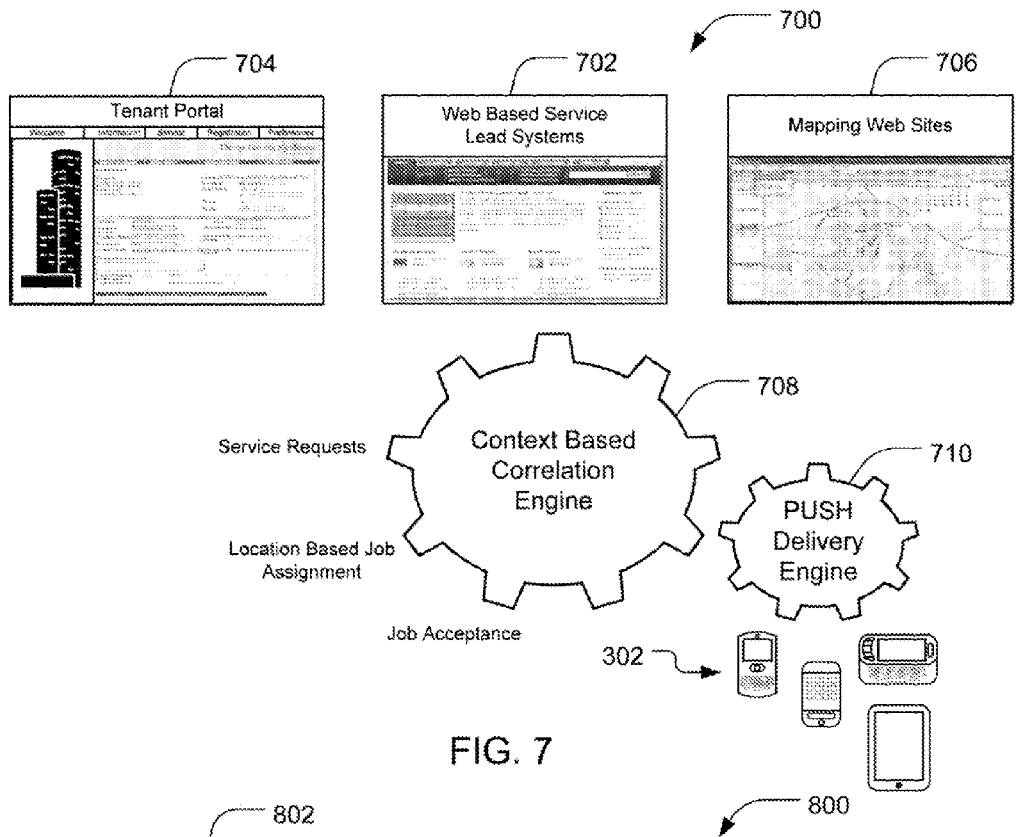
FIG. 7 illustrates one aspect of a system for real time delivery of context based information in a in a field services application according to the disclosed embodiments.

FIG. 7 illustrates one aspect of a system 700 for real time delivery of context based information in a in a field services application according to the disclosed embodiments. In the system 700 illustrated in FIG. 7, a method is directed to real time delivery of context based information in a field services application. According to one aspect, the system 700 is directed at field personnel in the pharmaceutical industry to push drug information and physician track record to a field personnel mobile device 302 like a smartphone or tablet or laptop computer. In another aspect, the method is directed for field service professional to push new leads to mobile device based on current location of the service personnel's mobile device and anticipated duration of a current task. The service lead information is extracted from web based service lead systems like servicemagic.com, servicemax.com, tenant portals 704, mapping web sites 706 and correlated with context and criteria by a context based correlation engine 708 based on service requests, location based job assignments, and/or job acceptance prior to being pushed to the mobile device 302 by a push delivery engine 710.

Figure 8:
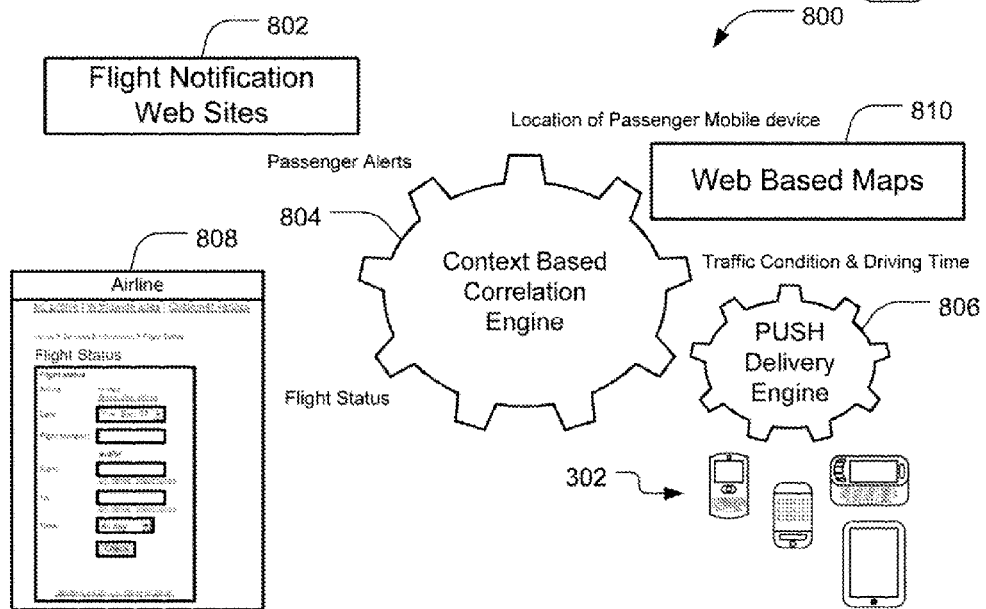
FIG. 8 illustrates one aspect of a system for real time delivery of context based information in an airline industry application according to the disclosed embodiments.

FIG. 8 illustrates one aspect of a system 800 for real time delivery of context based information in an airline industry application according to the disclosed embodiments. In the system 800 illustrated in FIG. 8, a method is directed to real time delivery of context based information in an airline industry application. According to one aspect, the system 800 is directed at airlines to provide flight updates 802 to travelers' mobile devices 302, such as smartphones, based on the location of the mobile device 302 after like travel times to get to flight based on traffic and weather conditions. A context based correlation engine 804 performs a context based correlation based on passenger alerts, location of passenger mobile device 302, traffic conditions and driving time, and/or flight status 808 before being pushed by a push delivery engine 806 to the mobile device 302.

Figure 9:
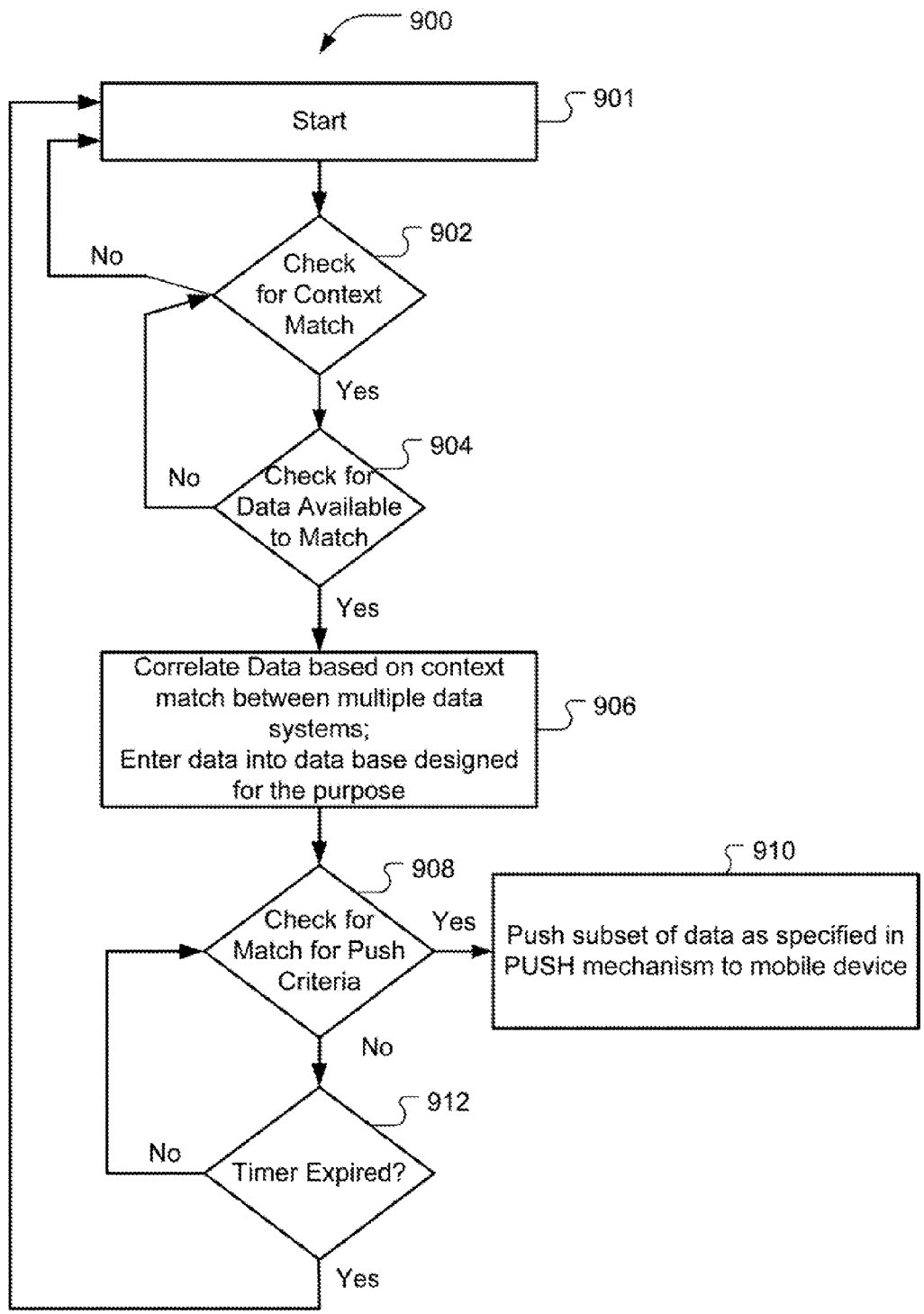
FIG. 9 is a logic diagram of one aspect of a context based subset and correlation engine integrated with push engine according to the disclosed embodiments.

FIG. 9 is a logic diagram 900 of one aspect of a context based subset and correlation engine integrated with push engine according to the disclosed embodiments. The logic diagram 900 illustrates a process by which any of the applications in connection with FIGS. 3-8 may be implemented. With reference now to the logic diagram 900, at 901, the process waits for an event trigger. When an event trigger occurs, at 902 a context based correlation engine component of a mobile product service application according to the disclosed embodiments checks for a context match. In one aspect, a context may be determined, for example, based on a location of a mobile device, calendar entry in Outlook® or mobile device, both location of mobile device and calendar entry, route point match, doctor page from a patient call, or a passenger and flight alert. When a context match is found, the process continues along the "Yes" path to check for data available to match at operation 904 otherwise the process continues along the "No" path to 901 to wait for the next event trigger. At 904, the data available to satisfy the context match across multiple data systems is determined, for example, based on information available at servers accessible through the cloud (Internet) such as salesforce.com or salesgenie.com for field sales applications; servicemagic.com or servicemax- .com for field service applications; getload.com or 123loadboard.com for trucking applications, patient information from electronic medical records systems for healthcare applications, and/or flight departure match from flight information system for airline industry applications. When data is available to match at 904, the process continues to 906 along the "Yes" path to correlate the data based on the context match between the multiple data systems. In one aspect, the data may be entered into a database designed for the purpose. When data is not available to match at 904, the process continues to 902 to check for context matches. At 908, the process checks for a match for push criteria. When a match is found, the process continues along "Yes" path to 910 to push a subset of data as specified in the PUSH mechanism to the mobile device. As discussed previously in the connection with FIGS. 3-8, a push delivery engine component of the mobile product service application according to the disclosed embodiments may be used to push the subset of data to the mobile device. From here, the process continues to 901 and waits for the next event trigger. When there is not match for push criteria the process proceeds along "No" path to determine whether a timer has expired and continues to check for a push criteria match until the timer expires. The process then continues along "Yes" branch to 901 to wait for the next event trigger.

The following portions of the present disclosure describe one aspect of a server and sever side software running (executing) in the "cloud" for delivering context based information to a mobile device in real time, the method comprising correlating information from multiple sources based on a context; determining a subset of information based on the context after correlating the information from the multiple sources based on the same or another context; and delivering the subset of information to a mobile device based on push technology.

Figure 10:
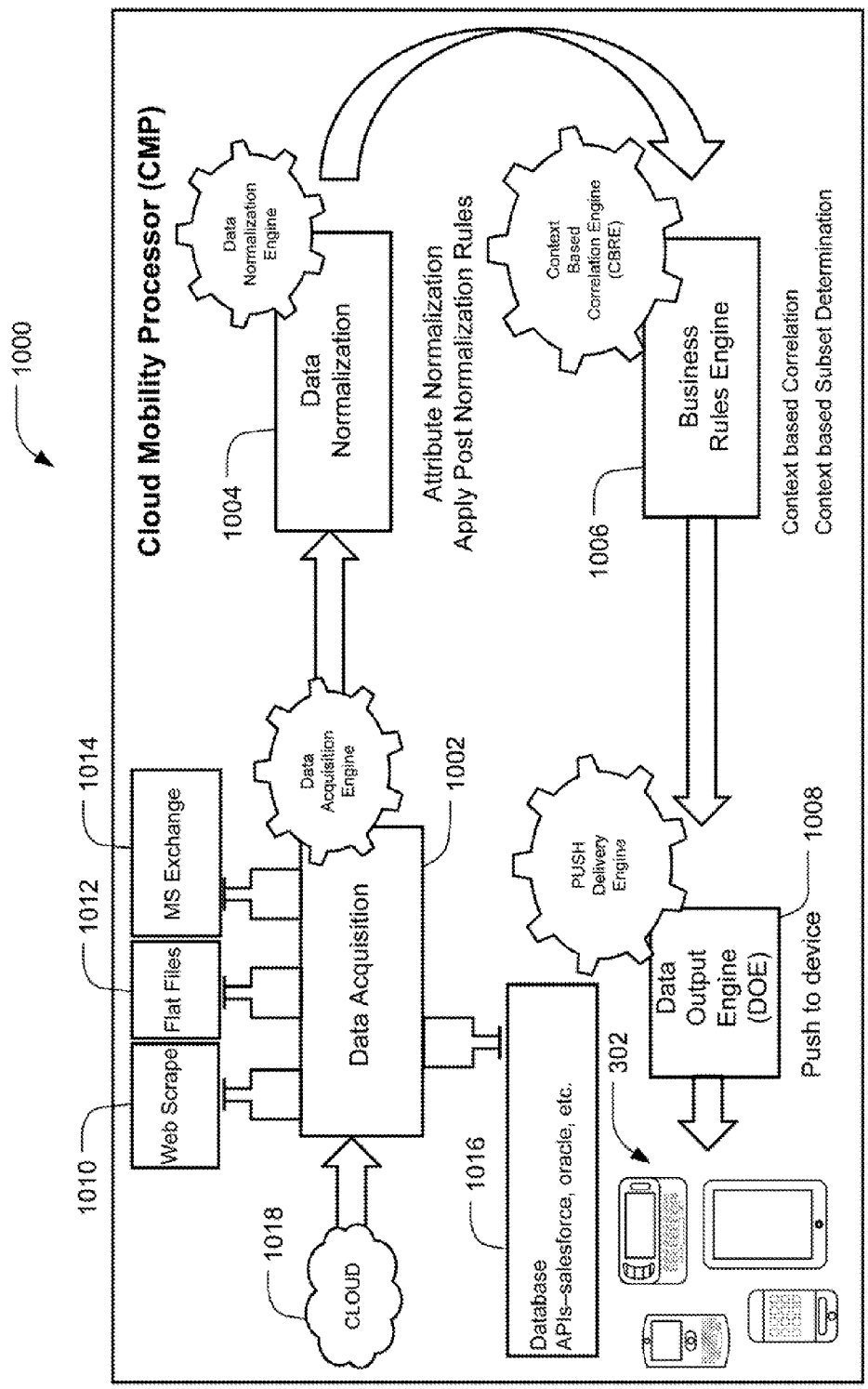
FIG. 10 illustrates one instance of one aspect of a system for real time delivery of context based information.

FIG. 10 illustrates one instance of one aspect of a system 1000 for real time delivery of context based information. Each instance of the system 1000 is referred to as a cloud mobility processor (CMP). In one general aspect, the CMP 1000 is a context based information correlation engine that operates similar to log and data correlation engines used by event correlation systems and further employs real time live data from multiple systems on the Internet (cloud 1018) with one or more contexts to correlate and determine a subset. As shown in FIG. 10, there are four software modules (or engines) included as part of the CMP 1000: a data acquisition engine 1002, a data normalization engine 1004, a business rules engine 1006 (BRE), and a data output engine 1008 (DOE).

The data acquisition engine 1002 obtains data from the cloud 1018 using multiple methods such as, but not limited to, scraping of web pages 1010, reading from flat files 1012, reading from calendar entries 1014 such as Microsoft® Exchange enterprise servers, reading from Mobile Device servers, and reading from databases 1016 and web services such as software-as-a-service (SaaS) applications such as, for example, salesforce.com, SAP, Oracle.

Figure 11:
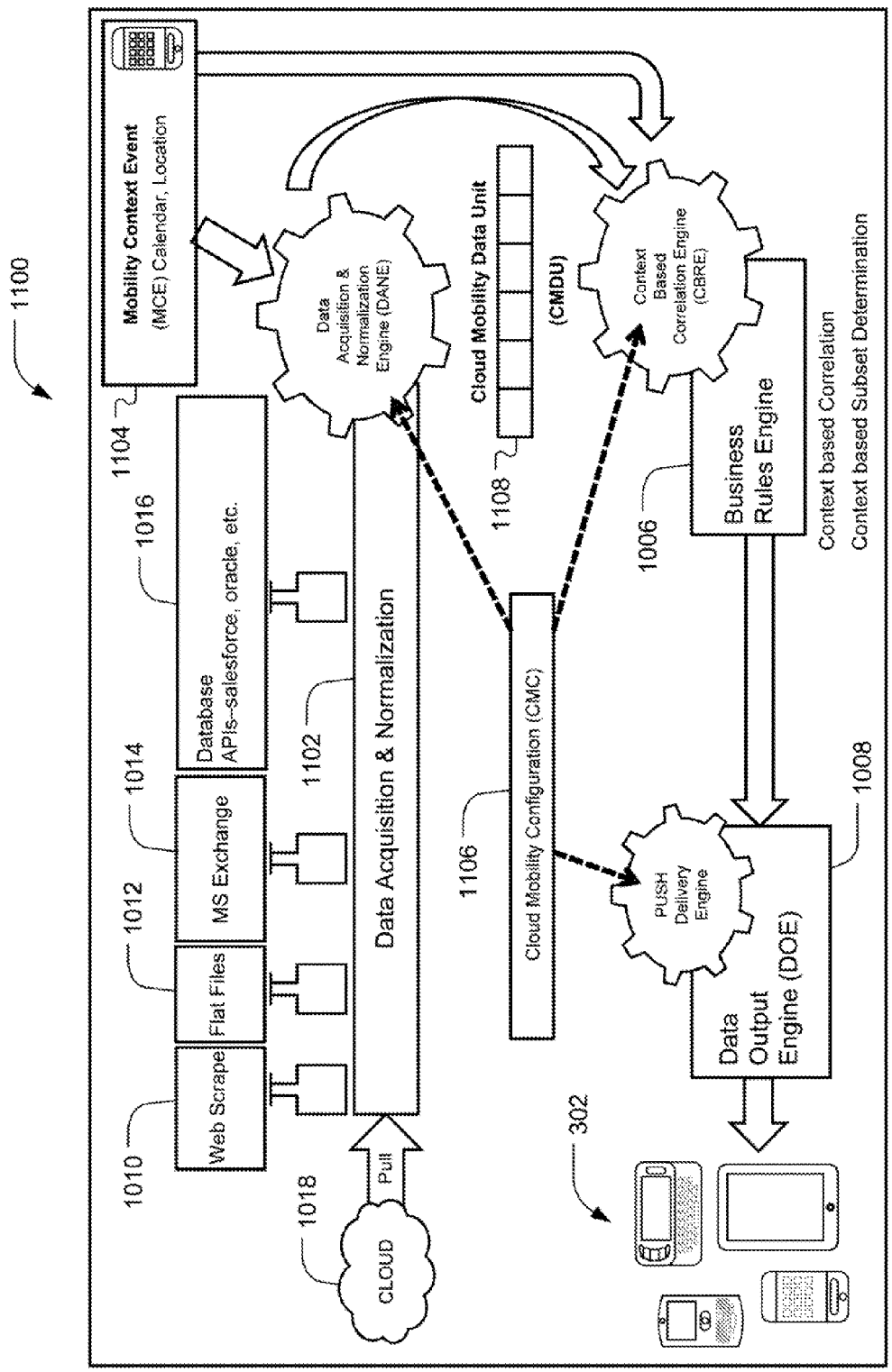
FIG. 11 illustrates one instance of one aspect of a system for real time delivery of context based information where data acquisition and data normalization modules are combined as a single module.

The data normalization engine 1004 performs attributes normalization such that data obtained from different sources can be saved in a database. The data normalization engine 1004 also applies post normalization rules (if any) such that data is made available for context based correlation, and context based subset determination. For practical purposes of implementation and improvement in efficiency, in one aspect, the data acquisition 1002 and data normalization 1004 modules are combined as a single module as shown in FIG. 11 below.

Turning back now to FIG. 10, the business rules engine 1006 performs, tracking of mobile user contexts such as sessions and locations, data transformations such as aggregation of multiple SaaS data sources, context based correlation, and context based subset determination. At a high level, the BRE 1006 tracks user context based on location of the user and where the user sessions are located. The BRE 1006 performs data transformations on various aggregations of information that is received from multiple sources such as software-as-a-service (SaaS), web locations like salesforce.com, salesgeni.com, LinkedIn.com, SAP, Siebel, airline reservations systems, patient information systems. The BRE 1006 correlates the data received from multiple sources.

In a field sales application of real time delivery of context based information, such as described herein in connection with FIG. 3, for example, may be employed by a field sales person who wants to correlate the information located in the company database to the information provided by salesforce.com, which includes sales leads generated by salesgeni.com. Also, the current contacts of the sales person may be associated with the current location of the sales person and, in one example, up to a quarter mile radius of the current location. The various sales targets may be correlated with the information from salesgeni.com and salesforce.com to see which one to target first. Other contacts may be correlated to the upcoming scheduled meetings and based on that the BRE 1006 can extract information from the salesforce.com and correlate to salesgenie.com other sales targets at the same account. That information is correlated and pushed to the mobile device of the sales person. The BRE 1006 provides contact-based correlation and performs a contact-based subset determination. The subset determination displays the data on a really small display on a mobile device such as a smartphone. Following the BRE 1006 is the DOE 1008.

The data output engine 1008 delivers the context based correlation information to a mobile device or multiple mobile devices 302 based on a context based content push to the mobile device or multiple mobile devices 302. The DOE 1008 takes the context based information which has been determined by the BRE 1006 and pushes it to the applicable mobile device(s) 302. The DOE 1008 tracks the configuration of the mobile device 302, it determines a pushing engine for the mobile device 302, and then applies a predetermined set of rules for that pushing engine to push the data to the mobile device(s) 302.

FIG. 11 illustrates one aspect of a cloud mobility processor 1100 (CMP) for real time delivery of context based information similar to the CMP 1000 shown in FIG. 10 but with the data acquisition 1002 and data normalization 1004 modules are combined as a single data acquisition and normalization module 1102 (DANE). The DANE 1102 is invoked with the occurrence of a mobility context event 1104 (MCE). In one aspect, the system 1100 may comprise two MCEs 1104—a calendar entry in Microsoft® Exchange server or mobile device 302, and a location of the mobile device 302. The DANE 1102 pulls data from the appropriate source using mechanisms like web scraping 1010, flat files on disks 1012, enterprise application servers 1014 like Microsoft® Exchange or from databases 1016 using APIs to salesforce.com, salesgenie.com, Oracle Siebel, SAP, ServiceMagic, Getloaded.com, airline passenger systems, or electronic medical record systems, among others, for example.

Figure 12:
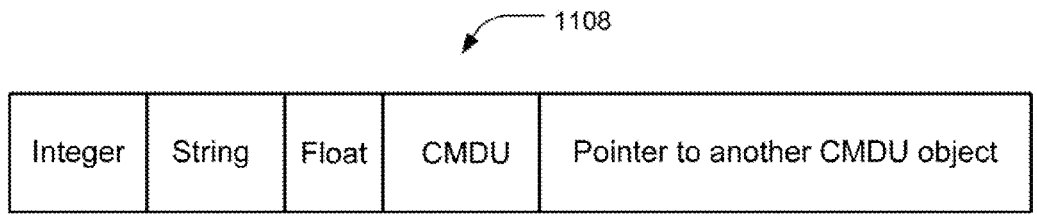
FIG. 12 illustrates normalized form of extracted data object of one aspect of a cloud mobility data unit.

In one aspect, the DANE 1102 may be implemented as a generic module that is configured using cloud mobility configuration 1106 (CMC) source. The CMC 1106 provides business vertical specific information where this SaaS is being deployed. For example, one specification of the CMC 1106 can be used to configure the DANE 1102 (and the CMP 1000, 1100 in FIGS. 10 and 11) for salesforce.com (or salesgenie.com) and will be different from that for healthcare providers electronic medical record systems, for example. The output of the combined DANE 1102 is a cloud mobility data unit 1108 (CMDU). The CMDU 1108 is a normalized form of extracted data object with the format shown in FIG. 12.

The information is acquired from the cloud 1018 by the DANE 1102 is provided (passed on) to the BRE 1006 in a data unit (packet) referred to as a the CMDU 1108, which is essentially the output of the DANE 1102 and the input to the BRE 1108, so that business rules can be applied to the data received from the cloud 1018. Thus, the CMDU 1108 is the key data that is generated within the CMP 1100. Accordingly, the CMDU 1108 enables the CMP 1100 to receive data from multiple sources, normalize the data to a format that the BRE 1006 can actually act upon to generate the context based information and to perform a context-based correlation near the context-based subset.

Turning now back to FIG. 11, the DANE 1102 processes asynchronous and heterogeneous MCEs 1104 and generates homogeneous CMDUs 1108. The CMDUs 1108 are queued up for processing by the BRE 1006 to perform correlation of data in multiple CMDUs 1108 and determine a context based subset of information and puts in the queue for the DOE 1008 to act on it to push the data to the mobile device 302. The DOE pushes the data output from the CMDUs 1108 based on fields that need to be pushed based on the entries in the configuration file.

The CMC 1102 specifies the basis of operation of all three engines as an XML schema. Each vertical application that is being mobilized has a separate CMC 1102 which is generated dynamically based on configuration options chosen by the user from the web interface to SaaS to mobilize the cloud. For example, at start up, the DANE 1102, BRE 1006, and DOE 1008 engines of the CMP 1000 require certain initialization guidelines based on what rules to employ. Such initialization guidelines are provided in the CMC 1106 file. The CMC 1106 is an XML schema that provides operational details regarding the DANE 1102, BRE 1006, and DOE 1008 engines. The CMC enables the CMP 1100 to be applied to various business environments like field sales, field service, airlines, healthcare, pharmaceuticals, financial, business intelligence, among others, as previously discussed in connection with FIGS. 3-6, for example. When the CMP 1100 is applied to different business environments, what changes are the data and the CMC 1106 sections.

A sample CMC 1102 specified in XML is shown below.

```
<?xml vercion="1.0" encoding="UTF-8"?>
<!-- New document created with EditiX at
Sun Nov 07 17:35:07 PST2010 -->
<CMP>
<Common>
<!-- Specify configuration parameters common
to all 3 engines for this specific Cloud Mobile
Processor -->
</Common>
<DANE>
<!-- Specify configuration parameters specfic
to Data Acquisition 4 Normalization Engine -->
</DANE>
<BRE>
<!-- Specify configuration parameters specific
to Business Rules Engine -->
<!-- Specify Correlation Engine & Subset
Determination Parameters -->
</BRE>
<DOE>
<CMDUschema>
<name> Salesforce
</name>
<name> Salegenie
</name>
<name> Getloaded
</name>
<name> OpenMRS
<name>
<name> AlaskaAirlines
</name>
</CMDUschema>
```

```
<!-- Specify configuration parameters specific
to Data Output Engine -->
<DOE>
<CMDUschema>
<!-- Specify CMU schema to use with this
CMP -.>
</CMDUschema>
</CMP>
```

The XML schemas for the CMDUs 1108 are defined separately such that the CMDUs 1108 are leveraged across multiple cloud based applications and services being mobilized. The CMC 1106 leverages XML to define hierarchical rules in the hierarchical BRE 1006 and parameters for context based correlation and context based subset determination.

The CMDU 1108 is transmitted to the BRE 1006. The BRE 1006 performs context-based correlation of CMDUs 1108 and determines a subset from the CMDUs 1108 based on the information defined in the CMCs 1106. As described above, the CMC 1106 is a configuration file that has an entry for particular business to be applied by the BE 1006. The CMC 1106 is formatted to includes a section with parameters that are common to all three engines (DANE 1102, BE 1006, DOE 1008). Additionally, the CMC 1106 includes parameters specifically tailored for the DANE 1102, parameters specifically tailored for the BRE 1006, and parameters specifically tailored for the DOE 1008. After the BRE 1006 reads such parameters (common and specific) from the CMC 1106, it waits for the DANE 1102 to pass the data to it in the form of a CMDU 1108 and then the BRE 1006 applies the specific business logical rules to the CMDU 1108. The BRE 1006 employs certain format of business rules and logic rules that are applied to the CMDU 1108 for various execution paths. In summary, the BRE 1006 comprises business logic rules. The business logic rules are defined as rule execution paths because the same rule can be applied in multiple ways. So if PAT formed one type of data it would be different based on which particle of rules are being used in that PAT. The rules are very generic. Finally, the path through the rules depends on the particular business application as defined by the CMC 1106.

Figure 13:
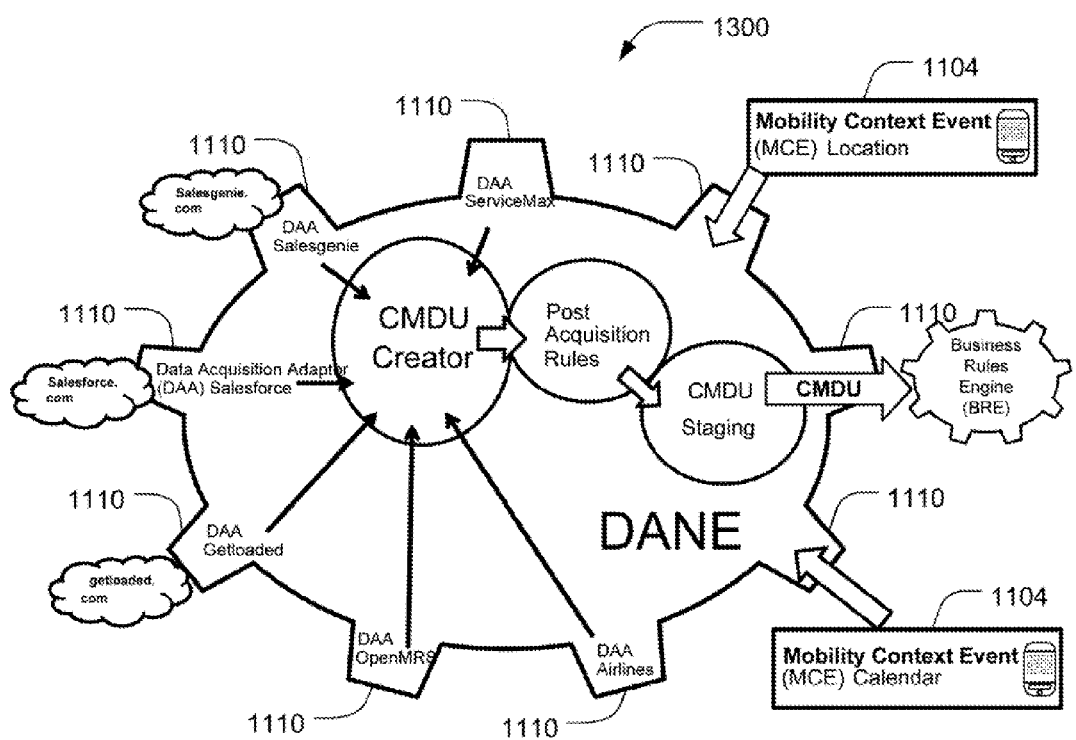
FIG. 13 is a block diagram of one aspect of a data acquisition and normalization engine.

FIG. 13 is a block diagram 1300 of one aspect of a DANE 1102. As stated earlier the DANE 1102 receives specifications from the CMC 1106 (FIG. 11) and gets information from various applications and cloud based services using data acquisition adaptors 1110 (DAA). The DANE 1102 is triggered into action by occurrence of an MCE 104. As shown, there may two MCEs 1104 are supported, calendar entry and location of the mobile device, although others are contemplated by the present disclosure. The DANE 1102 uses the DAAs 1110 to receive data from multiple sources in the cloud and select enterprise applications and produces CMDUs 1108 as output. The CMDUs 1108 are then processed by the BRE 1006.

Figure 14:
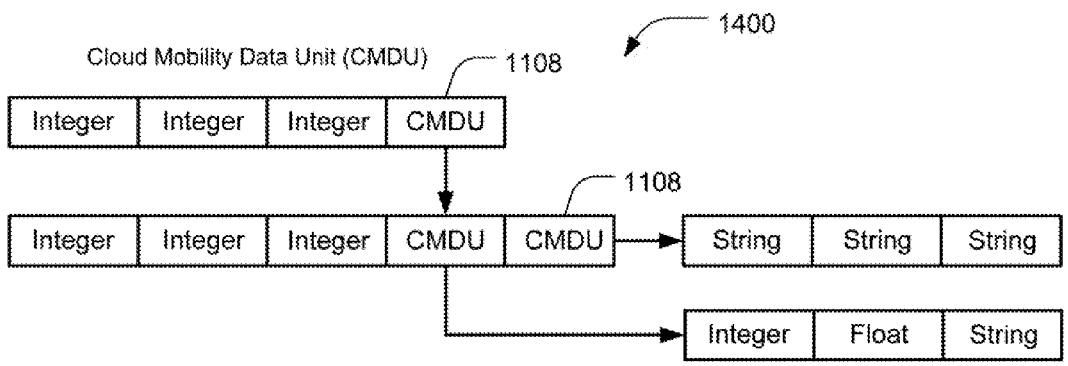
FIG. 14 is a diagram of one aspect of a cloud mobility data unit object, which represents a variety of hierarchical data.
Figure 15:
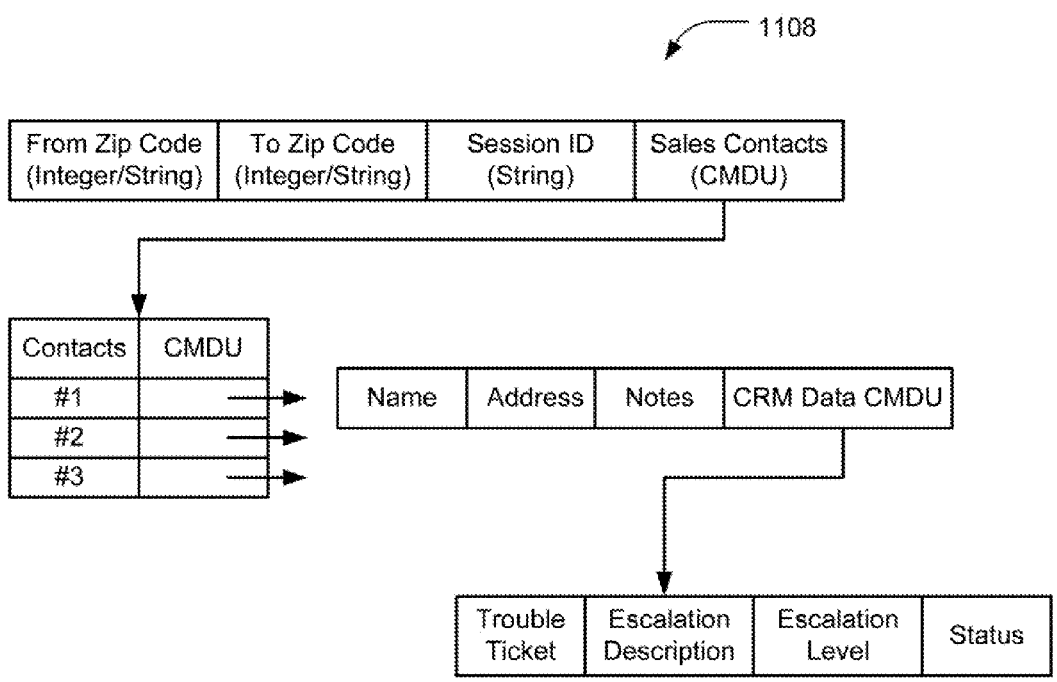
FIG. 15 is a diagram of a cloud mobility data unit object format in response to a location change.

FIG. 14 is a diagram 1400 of one aspect of a CMDU 1108 object, which represents a variety of hierarchical data. In one aspect, the hierarchical data includes, without limitation, XML, ASN.1, among other database schemas as obtained from enterprise cloud computing companies such as systems like salesforce.com, salesgenie.com, getloaded.com, airline passenger systems, electronic medical records systems, among others. The CMDUs 1108 are linked in a hierarchical fashion to represent the data in input source formats as shown in FIG. 14. In one aspect, the CMDU 1108 is a mixture of scalar and non-scalar data, arranged in a hierarchy three levels deep. For example, in one aspect, a sample application using salesforce.com information when invoked in response to a location change has CMDUs 1108 in the format shown in FIG. 15.

FIG. 16 is a diagram 1600 of one aspect of a BRE 1006. In one aspect, the BRE 1006 performs context based correlation of data in the CMDUs 1108 and determines "subset of information" 1502 (e.g., CMDU-subset) from the CMDUs 1108 based on information from the CMC 1106. The context is obtained by the BRE 1006 as MCEs 1104 are processed by the DANE 1102 and passed onto the BRE 1006 at the same time to be ready to process the CMDUs 1108 as they are made available by the DANE 1102. The BRE 1006 comprises one or more business logic rules 1504-1, 1504-2, 1504-n (BLR) arranged in one or more rule execution paths 1506-1, 1506-2, 1506-m (REP) as shown in FIGS. 17 and 18. Typically, each REP 1506 corresponds to one MCE 1104, but the disclosure is not limited as such.

Some examples of business logic rules are certain mathematical functions, string manipulation functions, flow control, mapping from one-to-one or -two from ranges or aggregation, among others. If data is received from a ".com" as a contact person on a, the data can be extracted from the link provided for that particular contact, which may assist a sales person or a field sales person understand a target customer in more detail, for example. The data received from salesforce.com or from salesgeni.com can be correlated and combined according to the particular business rules. Data from airline reservations systems also can be combined. Fore example, when the flight is scheduled and the passenger is ready to get on a certain plane, a message is sent (pushed) to the passenger mobile device with the particular flight information such as departure time, gate, and the like. In addition, other information may be delivered or pushed to the passenger mobile device that includes the current location of the passenger, the driving time to the airport, destination, and the like. And as the passenger gets to the airport close additional information such as restaurants and information about the restaurants may be pushed to the passenger mobile device, from which the airlines may be able to generate additional advertising revenue.

With reference now to FIGS. 16-18, the BLRs 1504 running the BRE 1006 operates on attributes of the CMDU 1108 leveraging the MCEs 1104 to convert the CMDUs 1108 for processing by the next rule in the REP 1506 or pass on a subset of the CMDUs 1502 to the DOE 1008. Some of the business logic actions performed by the BLRs 1504 include, without limitation, mathematical functions, string manipulation, flow control (if/them go to, loops), mapping (one-to-one, to-from ranges), aggregation (sums, counts), enrichment of data from other SaaS sources, correlation, notification of external entities of a specified CMDU state & logging. The BLRs 1504 perform a specific set of functions on data input to them and are reusable across multiple REPs 1506. When the REP 1506 processing the CMDUs 1108 is completed, the subset of information 1502 data is passed on to the DOE 1008 for delivery to the mobile device(s).

Figure 19:
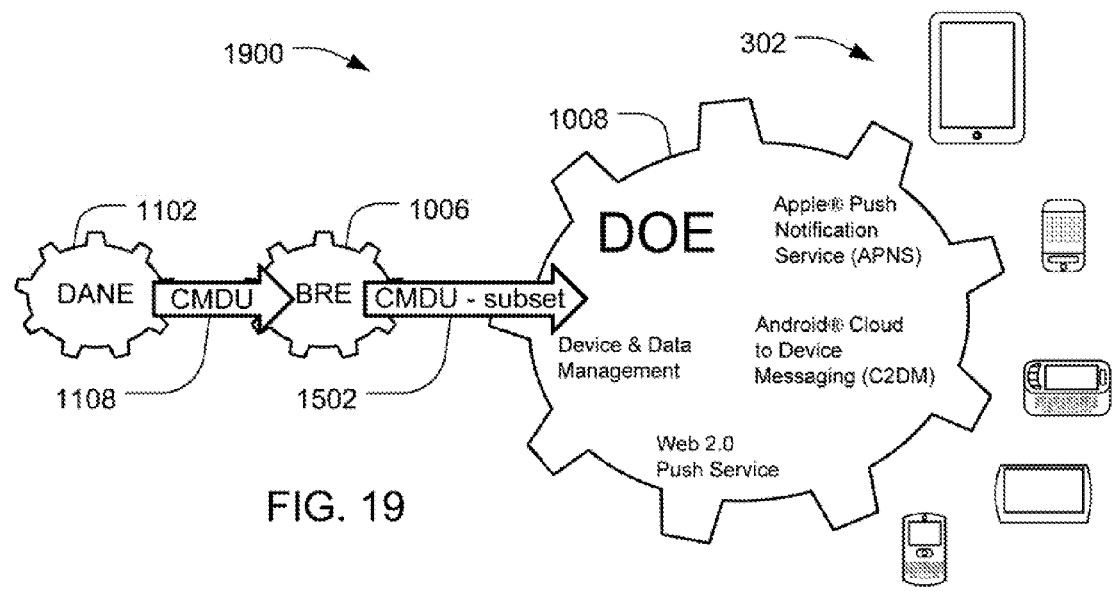
FIG. 19 is a diagram of one aspect of a data output engine mapping mobile devices to specific PUSH infrastructures in use.

FIG. 19 is a diagram 1900 of one aspect of a DOE 1008 mapping mobile devices 302 to specific PUSH infrastructures in use. In various aspects, the DOE 1008 leverages the Apple® Push Notification Service (APNS) and the Google® Cloud to Device Messaging (C2DM). The design is generic to include any other push notification service including Web 2.0 push services available in industry today.

Figure 20:
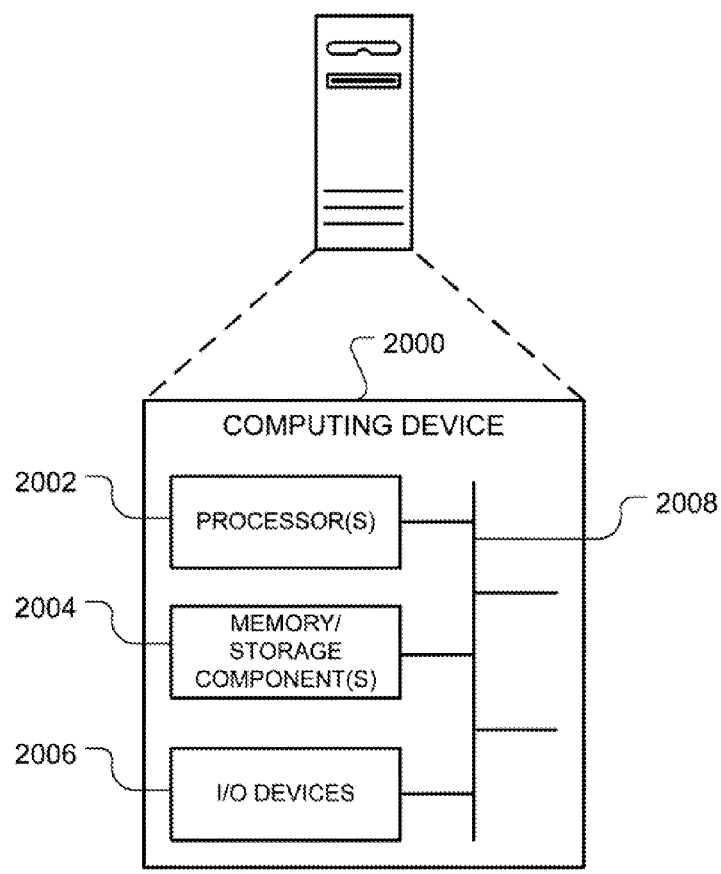
FIG. 20 illustrates one embodiment of a computing device which can be used in one embodiment of a system to implement the various described embodiments of for real time delivery of context based information to a mobile device set forth in this specification

FIG. 20 illustrates one embodiment of a computing device 2000 which can be used in one embodiment of a system to implement the various described embodiments for real time delivery of context based information to a mobile device set forth in this specification. The computing device 2000 may be employed to implement one or more of the computing devices, such as a mobile product service application in a system for real time delivery of context based information in a healthcare application according to the disclosed embodiments or any other suitably configured computing device. For the sake of clarity, the computing device 2000 is illustrated and described here in the context of a single computing device. It is to be appreciated and understood, however, that any number of suitably configured computing devices can be used to implement any of the described embodiments. For example, in at least some implementations, multiple communicatively linked computing devices are used. One or more of these devices can be communicatively linked in any suitable way such as via one or more networks. One or more networks can include, without limitation: the Internet, one or more local area networks (LANs), one or more wide area networks (WANs) or any combination thereof.

In this example, the computing device 2000 comprises one or more processor circuits or processing units 2002, one or more memory circuits and/or storage circuit component(s) 2004 and one or more input/output (I/O) circuit devices 2006. Additionally, the computing device 2000 comprises a bus 2008 that allows the various circuit components and devices to communicate with one another. The bus 2008 represents one or more of any of several types of bus structures, including a memory bus or memory controller, a peripheral bus, an accelerated graphics port, and a processor or local bus using any of a variety of bus architectures. The bus 2008 may comprise wired and/or wireless buses.

The processing unit 2002 may be responsible for executing various software programs such as system programs, applications programs, and/or modules to provide computing and processing operations for the computing device 2000. The processing unit 2002 may be responsible for performing various voice and data communications operations for the computing device 2000 such as transmitting and receiving voice and data information over one or more wired or wireless communications channels. Although the processing unit 2002 of the computing device 2000 includes single processor architecture as shown, it may be appreciated that the computing device 2000 may use any suitable processor architecture and/or any suitable number of processors in accordance with the described embodiments. In one embodiment, the processing unit 2002 may be implemented using a single integrated processor.

The processing unit 2002 may be implemented as a host central processing unit (CPU) using any suitable processor circuit or logic device (circuit), such as a as a general purpose processor. The processing unit 2002 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 2002 may be coupled to the memory and/or storage component(s) 2004 through the bus 2008. The memory bus 2008 may comprise any suitable interface and/or bus architecture for allowing the processing unit 2002 to access the memory and/or storage component(s) 2004. Although the memory and/or storage component(s) 2004 may be shown as being separate from the processing unit 2002 for purposes of illustration, it is worthy to note that in various embodiments some portion or the entire memory and/or storage component(s) 2004 may be included on the same integrated circuit as the processing unit 2002. Alternatively, some portion or the entire memory and/or storage component(s) 2004 may be disposed on an integrated circuit or other medium (e.g., hard disk drive) external to the integrated circuit of the processing unit 2002. In various embodiments, the computing device 2000 may comprise an expansion slot to support a multimedia and/or memory card, for example.

The memory and/or storage component(s) 2004 represent one or more computer-readable media. The memory and/or storage component(s) 2004 may be implemented using any computer-readable media capable of storing data such as volatile or non-volatile memory, removable or non-removable memory, erasable or non-erasable memory, writeable or re-writeable memory, and so forth. The memory and/or storage component(s) 2004 may comprise volatile media (e.g., random access memory (RAM)) and/or nonvolatile media (e.g., read only memory (ROM), Flash memory, optical disks, magnetic disks and the like). The memory and/or storage component(s) 2004 may comprise fixed media (e.g., RAM, ROM, a fixed hard drive, etc.) as well as removable media (e.g., a Flash memory drive, a removable hard drive, an optical disk, etc.). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 2006 allow a user to enter commands and information to the computing device 2000, and also allow information to be presented to the user and/or other components or devices. Examples of input devices include a keyboard, a cursor control device (e.g., a mouse), a microphone, a scanner and the like. Examples of output devices include a display device (e.g., a monitor or projector, speakers, a printer, a network card, etc.). The computing device 2000 may comprise an alphanumeric keypad coupled to the processing unit 2002. The keypad may comprise, for example, a QWERTY key layout and an integrated number dial pad. The computing device 2000 may comprise a display coupled to the processing unit 2002. The display may comprise any suitable visual interface for displaying content to a user of the computing device 2000. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 2002 may be arranged to provide processing or computing resources to the computing device 2000. For example, the processing unit 2002 may be responsible for executing various software programs including system programs such as operating system (OS) and application programs. System programs generally may assist in the running of the computing device 2000 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, Android OS, Apple OS or other suitable OS in accordance with the described embodiments. The computing device 2000 may comprise other system programs such as device drivers, programming tools, utility programs, software libraries, application programming interfaces (APIs), and so forth.

Various embodiments may be described herein in the general context of computer executable instructions, such as software, program modules, and/or engines being executed by a computer. Generally, software, program modules, and/or engines include any software element arranged to perform particular operations or implement particular abstract data types. Software, program modules, and/or engines can include routines, programs, objects, components, data structures and the like that perform particular tasks or implement particular abstract data types. An implementation of the software, program modules, and/or engines components and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, program modules, and/or engines may be located in both local and remote computer storage media including memory storage devices.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

It also is to be appreciated that the described embodiments illustrate example implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

It is worthy to note that any reference to "one embodiment" or "an embodiment" means that a particular feature, structure, or characteristic described in connection with the embodiment is included in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

What is claimed is:

1. A method comprising:
receiving real time live data that includes one or more contexts from multiple data systems on the Internet (cloud) configured to deliver the data to a mobile device;
correlating the data based on the one or more contexts of the data;
determining a subset of the data based on a context of the mobile device after correlating the data from the multiple data systems based on the one or more contexts of the data, the context of the mobile device based on a calendar entry of a user of the mobile device and a location of the mobile device;
delivering in real time, by a push engine, the subset of the data to the mobile device based on a push mechanism.

2. The method of claim 1, wherein the subset of the data includes service lead data.

3. The method of claim 1, further comprising:
tracking a configuration of the mobile device;
determining the push mechanism based on the configuration of the mobile device.

4. The method of claim 1, further comprising:
determining a most relevant subset of data from a plurality of determined subsets of data using a predetermined context of the mobile device;
delivering in real time the most relevant subset of data to the mobile device based on the push mechanism.

5. The method of claim 1, wherein the delivering the subset of data to the mobile device based on the push mechanism comprises delivering the subset of data in a manner that is agnostic to the mobile device.

6. The method of claim 1, further comprising normalizing the data received from the multiple data systems into the same format, or compatible formats.

7. The method of claim 1, further comprising ascertaining privacy of the data pushed to the mobile device when the data comprises location based security information or identity based security information.

8. A system comprising:
at least one processor;
memory storing instructions configured to instruct the at least one processor to perform:
receiving real time live data that includes one or more contexts from multiple data systems on the Internet (cloud) configured to deliver the data to a mobile device;
correlating the data based on the one or more contexts of the data;
determining a subset of the data based on a context of the mobile device after correlating the data from the multiple data systems based on the one or more contexts of the data, the context of the mobile device based on a calendar entry of a user of the mobile device and a location of the mobile device;
delivering in real time, by a push engine, the subset of the data to the mobile device based on a push mechanism.

9. A system comprising:
a data acquisition engine implemented through hardware elements and configured to receive real time live data that includes one or more contexts from multiple data systems on the Internet (cloud) configured to deliver the data to a mobile device;
a business rules engine implemented through the hardware elements and configured to:
correlate the data based on the one or more contexts of the data;
determine a subset of the data based on a context of the mobile device after correlating the data from the multiple data systems based on the one or more contexts of the data, the context of the mobile device based on a calendar entry of a user of the mobile device and a location of the mobile device;
a push engine implemented through the hardware elements and configured to deliver in real time the subset of the data to the mobile device based on a push mechanism.

10. The system of claim 9, wherein the push engine is further configured to deliver the subset of data to the mobile device based on the push mechanism in a manner that is agnostic to the mobile device.

11. The system of claim 9, further comprising a normalization engine implemented through the hardware elements and configured to normalize the data received from the multiple data systems into the same format or compatible formats.

12. The system of claim 9, wherein the business rules engine is further configured to ascertain privacy of the data when the data comprises location based security information or identity based security information.

13. The system of claim 9, wherein the business rules engine is further configured to track a configuration of the mobile device and the system further comprises:
a data output engine implemented through the hardware elements and configured to determine the push mechanism based on the configuration of the mobile device.

14. The system of claim 9, wherein:
the business rule engine is further configured to determine a most relevant subset of data from a plurality of determined subsets of data using a predetermined context of the mobile device;
the push engine is further configured to deliver in real time the most relevant subset of data to the mobile device based on the push mechanism.

* * * * *

UNITED STATES PATENT AND TRADEMARK OFFICE
CERTIFICATE OF CORRECTION

| | | |
|---|---|---|
| PATENT NO. | : 9,071,649 B2 | Page 1 of 1 |
| APPLICATION NO. | : 14/095919 | |
| DATED | : December 3, 2013 | |
| INVENTOR(S) | : Chandra S. Tekwani | |

It is certified that error appears in the above-identified patent and that said Letters Patent is hereby corrected as shown below:

On the title page item (54) and in the specification column 1 lines 1-3

Title: "System and Method for Real Time Delivery of Context Based Content from the Cloud to Mobile"

should be changed to:

"System and Method for Real Time Delivery of Context Based Content from the Cloud to Mobile Devices"

Signed and Sealed this
Second Day of February, 2016

Michelle K. Lee
*Director of the United States Patent and Trademark Office*